(12) United States Patent
Krivacic et al.

(10) Patent No.: US 9,087,453 B2
(45) Date of Patent: Jul. 21, 2015

(54) COMPUTER-IMPLEMENTED SYSTEM AND METHOD FOR SPONTANEOUSLY IDENTIFYING AND DIRECTING USERS TO AVAILABLE PARKING SPACES

(71) Applicant: Palo Alto Research Center Incorporated, Palo Alto, CA (US)

(72) Inventors: Robert T. Krivacic, San Jose, CA (US); Roger Hoover, San Bruno, CA (US); Ellen Isaacs, San Jose, CA (US); James Glasnapp, San Rafael, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/783,070

(22) Filed: Mar. 1, 2013

(65) Prior Publication Data

US 2014/0249742 A1    Sep. 4, 2014

(51) Int. Cl.
*G08G 1/14*        (2006.01)
*G06Q 10/02*       (2012.01)

(52) U.S. Cl.
CPC . *G08G 1/14* (2013.01); *G06Q 10/02* (2013.01)

(58) Field of Classification Search
None
See application file for complete search history.

(56) References Cited

U.S. PATENT DOCUMENTS

| | | | |
|---|---|---|---|
| 4,137,662 A | 2/1979 | Baumer | |
| 4,310,890 A | 1/1982 | Trehn et al. | |
| 4,356,903 A | 11/1982 | Lemelson et al. | |
| 4,532,418 A | 7/1985 | Meese et al. | |
| 5,266,947 A | 11/1993 | Fujiwara et al. | |
| 5,432,508 A | 7/1995 | Jackson | |
| 5,570,771 A | 11/1996 | Jacobs | |
| 5,710,557 A | 1/1998 | Schuette | |
| 5,710,743 A | 1/1998 | Dee et al. | |
| 5,740,050 A | 4/1998 | Ward, II | |
| 5,770,845 A | 6/1998 | Hjelmvik | |
| 5,777,951 A | 7/1998 | Mitschele | |
| 5,841,369 A | 11/1998 | Sutton et al. | |
| 5,910,782 A | 6/1999 | Schmitt et al. | |

(Continued)

FOREIGN PATENT DOCUMENTS

WO    2004084145    9/2004
WO    2011002583    1/2011

OTHER PUBLICATIONS

Weinberger et al., US Parking Policies: An Overview of Management Strategies, Institute for Transportation & Development Policy, http://www.streetsblog.org/wp-content/pdf/ITDP_Parking_FullReport.pdf, Feb. 2010, retrieved Jun. 7, 2013.

(Continued)

*Primary Examiner* — John R Olszewski
*Assistant Examiner* — Jess Whittington
(74) *Attorney, Agent, or Firm* — Patrick J. S. Inouye; Krista A. Wittman

(57) ABSTRACT

A computer-implemented system and method for spontaneously identifying and directing motorists to available parking spaces is provided. Parking spaces are tracked to determine a status of each space. A destination of a user is received. At least one parking space is identified as available and near the destination of the user. An estimated arrival time of the user to the available parking space is determined. An arrival threshold is applied to the estimated arrival time of the user and a reservation offer for the available space is sent to the user when the estimated arrival time satisfies the arrival threshold.

20 Claims, 9 Drawing Sheets

(56) References Cited

U.S. PATENT DOCUMENTS

| | | | |
|---|---|---|---|
| 6,078,272 A | 6/2000 | Jacobs et al. | |
| 6,081,205 A | 6/2000 | Williams | |
| 6,081,206 A | 6/2000 | Kielland | |
| 6,102,285 A | 8/2000 | Elias | |
| 6,111,522 A | 8/2000 | Hiltz et al. | |
| 6,188,328 B1 | 2/2001 | Ho | |
| 6,243,028 B1 | 6/2001 | Krygler et al. | |
| 6,243,029 B1 | 6/2001 | Tomer | |
| 6,275,169 B1 | 8/2001 | Krygler et al. | |
| 6,373,401 B2 | 4/2002 | Ho | |
| 6,411,895 B1 * | 6/2002 | Lau et al. | 701/425 |
| 6,437,692 B1 | 8/2002 | Petite et al. | |
| 6,459,386 B1 | 10/2002 | Jones | |
| 6,493,676 B1 | 12/2002 | Levy | |
| 6,505,774 B1 | 1/2003 | Fulcher et al. | |
| 6,513,711 B1 | 2/2003 | Hjelmvik | |
| 6,519,329 B1 | 2/2003 | Hjelmvik | |
| 6,577,248 B1 | 6/2003 | Hjelmvik | |
| 6,750,786 B1 * | 6/2004 | Racunas, Jr. | 340/932.2 |
| 6,791,473 B2 | 9/2004 | Kimbria et al. | |
| RE38,626 E | 10/2004 | Kielland | |
| 6,812,857 B1 | 11/2004 | Kassab et al. | |
| 6,816,085 B1 | 11/2004 | Haynes et al. | |
| 6,823,317 B1 | 11/2004 | Quimet et al. | |
| 6,885,311 B2 | 4/2005 | Howard et al. | |
| 6,889,899 B2 | 5/2005 | Siberberg | |
| 6,927,700 B1 | 8/2005 | Quinn | |
| 6,929,179 B2 | 8/2005 | Fulcher et al. | |
| 6,946,974 B1 | 9/2005 | Racunas Jr. | |
| 7,002,487 B1 | 2/2006 | Montgomery, Sr. | |
| 7,014,355 B2 | 3/2006 | Potter, Sr. et al. | |
| 7,019,670 B2 | 3/2006 | Bahar | |
| 7,123,166 B1 | 10/2006 | Haynes et al. | |
| 7,194,417 B1 * | 3/2007 | Jones | 705/5 |
| 7,237,716 B2 | 7/2007 | Silberberg | |
| 7,277,010 B2 | 10/2007 | Joao | |
| RE40,013 E | 1/2008 | Quinn | |
| 7,321,317 B2 | 1/2008 | Nath et al. | |
| 7,382,244 B1 | 6/2008 | Donovan et al. | |
| 7,393,134 B2 | 7/2008 | Mitschele | |
| 7,474,589 B2 | 1/2009 | Showen et al. | |
| 7,579,964 B2 | 8/2009 | Nath et al. | |
| 7,652,593 B1 | 1/2010 | Haynes et al. | |
| 7,667,619 B2 | 2/2010 | Montgomery, Sr. | |
| 7,688,225 B1 | 3/2010 | Haynes et al. | |
| 7,714,742 B1 | 5/2010 | Noworolski et al. | |
| 7,768,426 B2 | 8/2010 | Groft | |
| 7,791,501 B2 | 9/2010 | Ioli | |
| 7,791,503 B2 | 9/2010 | Breed et al. | |
| 7,805,239 B2 | 9/2010 | Kaplan et al. | |
| 7,840,427 B2 | 11/2010 | O'Sullivan | |
| 7,855,935 B1 | 12/2010 | Lauder et al. | |
| 7,893,847 B2 * | 2/2011 | Shanbhag et al. | 340/932.2 |
| 7,900,966 B1 | 3/2011 | Stennett | |
| 7,949,464 B2 | 5/2011 | Kaplan et al. | |
| 7,956,769 B1 | 6/2011 | Pearl | |
| 7,966,215 B1 * | 6/2011 | Myers et al. | 705/13 |
| 8,466,962 B2 | 6/2013 | Hutchison | |
| 2002/0077953 A1 | 6/2002 | Dutta | |
| 2002/0099574 A1 | 7/2002 | Cahill et al. | |
| 2003/0055727 A1 | 3/2003 | Walker et al. | |
| 2004/0068433 A1 | 4/2004 | Chatterjee et al. | |
| 2004/0236615 A1 | 11/2004 | Msndy | |
| 2004/0254840 A1 | 12/2004 | Slemmer et al. | |
| 2005/0280555 A1 * | 12/2005 | Warner | 340/932.2 |
| 2006/0068704 A1 | 3/2006 | Bhakta et al. | |
| 2006/0247848 A1 | 11/2006 | Cheng | |
| 2006/0259353 A1 | 11/2006 | Gutmann | |
| 2007/0008181 A1 | 1/2007 | Rollert et al. | |
| 2007/0050240 A1 | 3/2007 | Belani et al. | |
| 2007/0136128 A1 | 6/2007 | Janacek et al. | |
| 2007/0290888 A1 | 12/2007 | Reif et al. | |
| 2008/0133425 A1 | 6/2008 | Grush | |
| 2008/0136674 A1 | 6/2008 | Jang et al. | |
| 2008/0208680 A1 | 8/2008 | Cho | |
| 2009/0125341 A1 | 5/2009 | Somoza et al. | |
| 2009/0164635 A1 | 6/2009 | Denker et al. | |
| 2009/0276236 A1 | 11/2009 | Adamczyk et al. | |
| 2009/0309760 A1 | 12/2009 | Chew | |
| 2010/0106514 A1 | 4/2010 | Cox | |
| 2010/0190510 A1 * | 7/2010 | Maranhas et al. | 455/456.1 |
| 2010/0328104 A1 | 12/2010 | Groft | |
| 2011/0035261 A1 | 2/2011 | Handler | |
| 2011/0068739 A1 | 3/2011 | Smith | |
| 2011/0127944 A1 | 6/2011 | Saito et al. | |
| 2011/0131083 A1 | 6/2011 | Redmann et al. | |
| 2011/0140658 A1 | 6/2011 | Outwater et al. | |
| 2011/0193522 A1 | 8/2011 | Uesugi | |
| 2011/0227533 A1 | 9/2011 | Wolfien | |
| 2011/0241619 A1 | 10/2011 | Young et al. | |
| 2011/0246252 A1 | 10/2011 | Uesugi | |
| 2011/0257881 A1 | 10/2011 | Chen et al. | |
| 2012/0053998 A1 | 3/2012 | Redmann et al. | |
| 2012/0112698 A1 | 5/2012 | Yoshimura et al. | |
| 2012/0173292 A1 | 7/2012 | Solomon et al. | |
| 2012/0188101 A1 | 7/2012 | Ganot | |
| 2013/0073350 A1 | 3/2013 | Blustein | |
| 2013/0144660 A1 * | 6/2013 | Martin | 705/5 |

OTHER PUBLICATIONS

Geroliminis et al., "A review of green logistics schemes used in cities around the world", UC Berkeley Center of Future Urban transport: A volvo center of excellence, http://escholarship.org/uc/item/4x89p485.pdf, Aug. 1, 2005, retrieved Jun. 19, 2013.

Smith et al., "Intelligent Transportation Systems and Truck Parking," Feb. 2005.

* cited by examiner

COMPUTER-IMPLEMENTED SYSTEM AND METHOD FOR SPONTANEOUSLY IDENTIFYING AND DIRECTING USERS TO AVAILABLE PARKING SPACES

FIELD

This application relates in general to motor vehicle parking and, in particular, to a computer-implemented system and method for identifying and directing users to available parking locations.

BACKGROUND

Public roads primarily facilitate traffic. Parking is offered as a secondary benefit incident to vehicle throughway. Local governments typically regulate parking on public roads, whether at curbside, in municipal lots, or on other public property, through a regulatory scheme that promotes public safety and provides revenue generation. The impact of regulated control over on-street parking affects all motorists, as well as urban residents, local businesses, commercial drivers, and other parties that use or rely upon on-street parking. Drivers who need to park their vehicle are directly impacted by regulated parking control. For example, looking for a parking space wastes time and fuel, contributes to traffic congestion, creates frustration and stress, and increases pollution, while disregarding parking regulations can result in parking tickets, fines, or towing. Despite these downsides, parking regulation remains a practical necessity.

Commonly, public parking is controlled through parking regulations and prohibitions that permit parking on a first-come, first-served basis, with few exceptions, such as allowed by special permit. However, allowing users to locate on-street parking on a first-come, first-served basis can create congestion on the streets as drivers slow down to look for available parking, wait for parked cars to leave a parking spot, and stop to read parking restrictions posted on signs associated with some on-street parking spots. Further congestion is experienced as parking garages or parking lots become full and drivers are forced to look for empty on-street spaces or wait for an empty space in the lot or garage. Additionally, users can become frustrated looking for an available parking space and may be discouraged from visiting areas in which parking is difficult to locate.

Providing reservation systems that allow users to place a reservation for a parking space and identifying available spaces can help alleviate many of the problems and frustrations associated with parking. For instance, SFPark collects and distributes information to drivers detailing available parking. Wireless sensors detect when parking availability in real-time. Based on the detected availability, parking prices are adjusted to reduce parking demand in areas with a high volume of occupied spaces and increase demand in areas where parking is readily available. However, there is no guarantee that a parking space will still be available by the time a driver reaches the space. For example, another driver may see the space and decide to park before the driver to whom the space was identified can park. Additionally, parking spaces that are more preferable to the user can become available while the driver is en route to the identified parking space; however, the driver may be unaware of the availability if he fails to conduct a further search for available spaces.

Therefore, there is a need for more efficiently directing users to the identified available parking spots, allowing reservation, and ensuring that the spaces are available to reduce congestion on the streets and to improve the experience of drivers wishing to park.

SUMMARY

A computer-implemented system and method for spontaneously identifying and directing motorists to available parking spaces is provided. Parking spaces are tracked to determine a status of each space. A destination of a user is received. At least one parking space is identified as available and near the destination of the user. An estimated arrival time of the user to the available parking space is determined. An arrival threshold is applied to the estimated arrival time of the user and a reservation offer for the available space is sent to the user when the estimated arrival time satisfies the arrival threshold.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

In areas that are overpopulated or that have minimal parking, locating available parking, such as in a lot or garage, or on-street parking can be difficult. Motorists, urban residents, commercial drivers, out-of-town visitors, and other parties that use or rely upon public parking often drive around looking for available parking until a space is found or until that individual gives up. Drivers can become easily frustrated looking for an available parking space, while creating congestion and pollution by aimlessly driving around looking for an available parking space. If a driver becomes too frustrated, he may be discouraged from later visiting areas where parking is difficult to locate. Identifying and directing users to available parking spots can assist in alleviating congestion, pollution, and frustration.

Figure 1:
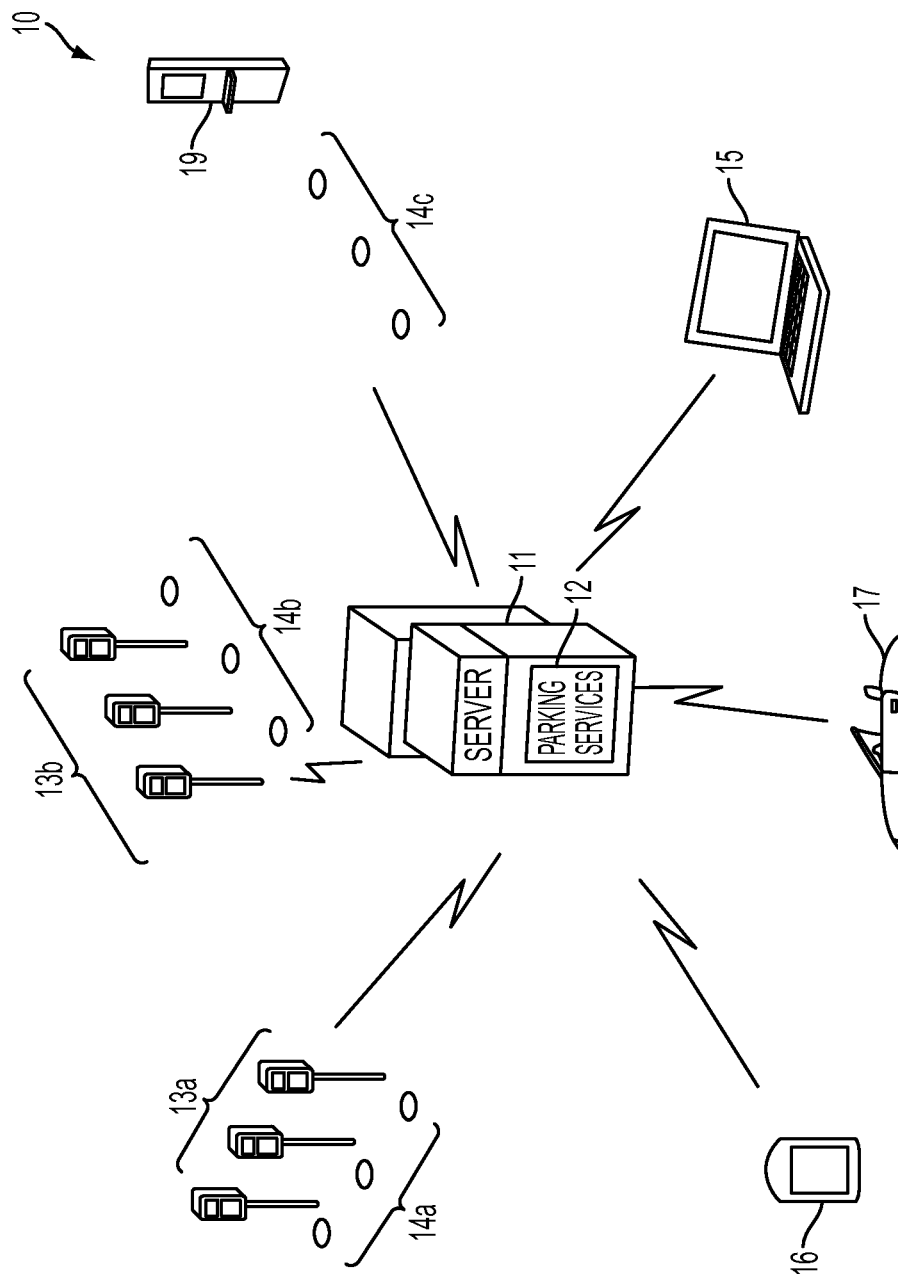
FIG. 1 is a block diagram showing a computer-implemented system for spontaneously identifying and directing users to available parking spaces, in accordance with one embodiment.

Locating available parking spaces, allowing users to book reservations, and providing directions can occur through a network of mobile computing devices, smart parking devices, and parking services. FIG. 1 is a block diagram showing a computer-implemented system 10 for spontaneously identifying and directing users to available parking spaces in accordance with one embodiment. Parking, whether controlled by local government or privately owned, and regardless of whether curbside, on a driveway, in cutouts in front of a driveway, within a parking lot, or in other physical locations will henceforth be called "on-street parking" or simply, "parking."

A suite of parking services 12 is provided through one or more servers 11, which are located within a network of smart parking devices 13a-b, sensors 14a-c, and parking services kiosks 19. The parking services 12 are account-based and enable motorists and other users to determine the availability of, reserve, and efficiently use parking, as well as receive directions to the available parking, as further described below in detail beginning with reference to FIG. 4. Users can interface with the parking services 12 remotely over a network, such as the Internet, using a user device through a wired or wireless connection. The user devices can include notebook or tablet computers 15, smart telephones 16 and similar personal mobile electronic devices, and on-board navigational or informational devices 17, such as GPS-enabled devices. The parking devices 13a-b and parking services kiosks 19 also have user interfaces that interact with the parking services, as described below with reference to FIG. 2.

The parking devices 13a-b and parking services kiosks 19 are each associated with one or more parking spaces and allow motorists to reserve or transact on-street parking through the parking services server 11. Herein after, a user, motorist, and driver have the same intended meaning, unless otherwise indicated. Each parking device 13a-b can include a physical parking availability indicator (not shown), either directly interfaced with the parking device 13a-b or remotely connected through the parking services server 11. Physical parking availability indicators audibly or visually signal parking availability to motorists. In a further embodiment, the parking availability indicators are virtual and are provided electronically to motorists using their mobile devices. The parking availability indicators are further discussed below with reference to FIG. 3. Finally, each parking space can have a sensor 14a-c that determines whether a parking space is occupied by a motor vehicle, either directly interfaced with the parking device 13a-c or remotely connected through the parking services server 11.

The sensors 14 a-c can be used to determine whether a parking space is available or not. In one embodiment, a parking space is determined to be available when the space is unoccupied, such that no vehicle is detected to reside in the space. In contrast, a parking space is unavailable when a vehicle is detected to be present in the parking space. A determination of the availability, or unavailability, of a parking space is transmitted from the parking device or sensor itself to the parking services server in real time. The available parking spaces near a destination of the user can be provided to that user in reply to a request for available parking, as further described below with reference to FIGS. 4 and 6. The user can transmit the parking request to the parking services server 11 via one or more mobile devices 15-17. The request can include a destination of the user, as well as the user's preference of parking characteristics, such as a duration of parking needed, desired price or price range of the parking, site of the parking, such as along a street or in a garage, and type of the parking, such as back in angle parking or parallel parking. Other parking characteristics are possible. In one embodiment, the user preferences can be stored in a user record associated with an account of the user and maintained by a database (not shown) interconnected with the parking services server 11.

Once received, the request is processed and one or more available parking spaces at or near the user's destination are identified. The number of available spaces can be reduced based on the user preferences by keeping only those available spaces that satisfy at least one preference. Subsequently, at least one of the identified available parking spaces can be transmitted to the user via the mobile device 15-17 with a reservation offer. The parking spaces to be transmitted can be selected based on an estimated arrival time of the user, as further described below with reference to FIG. 7. Upon receipt of the reservation offer, the user can decide whether he will reserve the space to prevent the space from becoming occupied prior to his arrival. In one embodiment, directions to the reserved space can be provided to the user. However, in a further embodiment, the directions can be provided regarding of whether a reservation was made, but the space may not be available by the time the user arrives if the space is not reserved. Additionally, while the user in en route to the available space, another space that is more desirable to the user may become available. This desirable space can be offered to the user and if reserved, the reservation of the previous space is cancelled.

Figure 2:
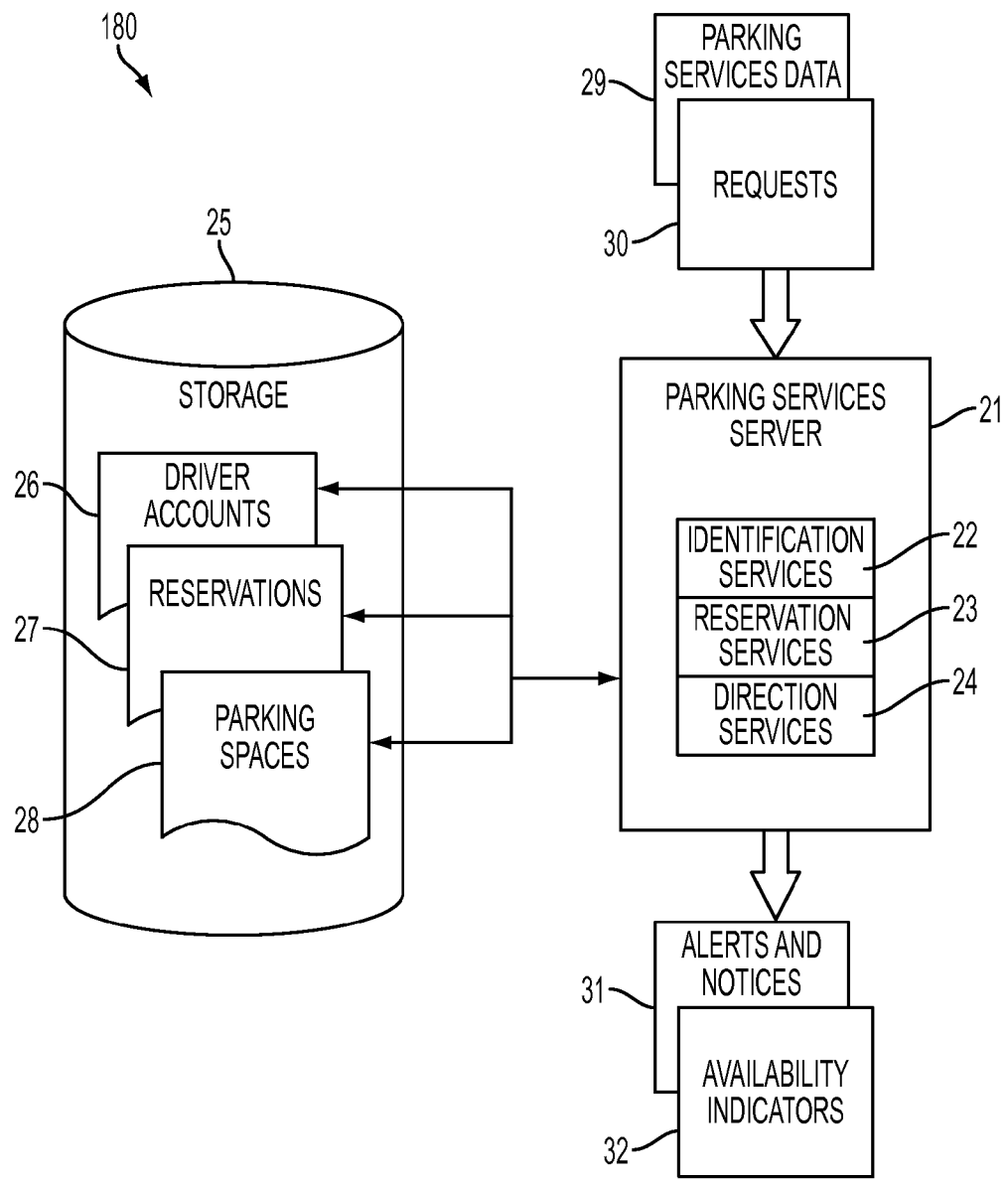
FIG. 2 is a functional block diagram showing the parking services of FIG. 1.

The parking services 12 and associated parking devices 13a-b and parking services kiosks 19, as well as mobile devices 15-17, where applicable, implement network security protocols to ensure secure communications. As necessary different secure communications schemes and levels can be applied over all communications. For example, public key cryptography could be used in various secure protocols to protect communications between all system elements. The parking services identifies available parking spaces for providing to the user, books reservations, and provides directions to the available spaces. FIG. 2 is a functional block diagram 20 showing the parking services 21 of FIG. 1. The parking services 21 are implemented in software and execution of the software is performed as a series of process or method modules or steps. The parking services 12 may be executed on one or more computer systems, which may singly or in combination logically constitute a particular form of "server." For instance, in one embodiment, a Web server delivers Web pages and content to Web-based clients, such as Web browsers executing on mobile devices 15, 16, 17. The Web server can be implemented using more than one computer, depending upon the load.

Similarly, the provisioning of the system functionality is divided between the one or more servers and the various end-user devices with which a motorist directly interfaces, such as parking devices 21, parking services kiosks 19, and mobile devices 15, 16, 17. Programmatic duties are divided between the software that runs in each end-user device and the servers. The division of labor balances several competing goals, which includes a low power requirement for the end-user device, fast user interaction response, and keeping end-user device programming relatively simple.

Additionally, the Web server may be supported by caching servers that cache the Web content and help reduce bandwidth consumption and system load. The caching servers may also be implemented using more than one computer. System state for the parking services 12 is kept in a database server, which keeps track of the state of all of the parking devices 21, parking services kiosks 19, and sensors 24, all of the parking accounts, including the mobile devices 15, 16, 17 all of the permits, all of the parking citations, all of the billings, all of the parking policies, and so forth. The database server may be implemented using more than one computer. As well, a suite of services offered by the parking services can also be fielded by through cloud computing. Henceforth, for simplicity, the set of services will be discussed without regard to the nature of the implementing servers or the underlying physical topology of the supporting computers, except as specifically noted.

At any given time, several coordinated processes execute across the servers. Depending upon the scale of the system, several computers may need to work together to carry out each of the services. The services can include managing parking regulations, tracking parking space occupancy, identification services 22 for determining parking space availability based on the parking regulations and parking space occupancy, reservation services 23 for booking reservations, and direction services 24 for providing directions to the available parking spaces in real time. The parking regulations can override a determination of whether a parking space is occupied or not. For example, a space may not be occupied, but parking can still be prohibited due to a regulation that prevents parking after 10 p.m. and would be rendered unavailable. In one example, a parking space can be determined to be occupied, at a particular time, when a vehicle is located within the space or when a motorist or driver reserves one of the parking spaces in advance for the given time or on-site as a form of "instant" parking reservation, according to commonly-owned U.S. Patent Application Publication No. 2012/0092190, filed on Sep. 21, 2012, pending, the disclosure of which is hereby incorporated by reference.

Once available spaces are identified, users with parking accounts 26 can make parking reservations. The parking accounts 26 are maintained in storage 25 coupled to the parking services server 21 provide a parking identity to motorists and other users, enabling transaction-based approaches to reserving, billing, and managing parking. A parking identity can be established through a parking account 26. A parking identification card can be issued for a parking account 26. Alternatively, a credit card, driver's license, telephone calling card, or motor vehicle license plate number could be associated with a parking account 26 in lieu of a parking identification card. The parking accounts 26 can be express, temporary, or implicit parking accounts. An express parking account is the norm, whereas a temporary parking account is not permanently stored and an implicit parking account is generally created for a single parking event.

Requests 30 for available parking can be received by the parking services server 21. Additionally, the parking services server 21 receives service data 20, which can include real-time parking information that can be used to determine parking availability, such as parking accounts and sensor data. A status 28 of the parking spaces can be stored in the storage 25 for identifying available spaces for transmitting to the user. The available parking spaces can be offered for reservation and the reservation services can include booking a reservation for a user regardless of a type of the user, or user specific reservations, including driver services that assist motorists in reserving a parking space or other needs, as described in U.S. Patent Application Publication No. 2012/0092190 to Stefik, filed Jun. 15, 2011, pending, the disclosure of which is hereby incorporated by reference; resident services that cater to the particular needs of urban denizens, as described in U.S. Patent Application Publication No. 2012/0095812, to Stefik, filed Aug. 24, 2011, pending, the disclosure of which is hereby incorporated by reference; merchant services that enable local businesses to obtain parking for customers and related needs, as described in U.S. Patent Application Publication No. 2012/0095791 to Stefik, filed on Aug. 24, 2011, pending, the disclosure of which is hereby incorporated by reference; commercial services offering commercial parking reservations through flexible loading zones, as described in U.S. Patent Application Publication No. 2012/0095792 to Stefik, filed on Aug. 24, 2011, pending, the disclosure of which is hereby incorporated by reference; and parking authority services.

The requests 30 for available parking for parking are received in real-time from users and the overall status of parking availability is continually revised through the parking service data 29. Available spaces are transmitted to the user via the user device, as requested by the user. Once received, the user can reserve one of the available spots via a reservation 27, which is transmitted to the parking services server 21 and stored in the storage 25.

As required, user notices 31, parking alerts 31, availability indicators 32, and other information are sent out, either through a physical device, such as via a parking indicator or the display on a parking device, or by electronic transmission to user's mobile devices 15, 16, 17. Other input data or output information are possible. The user notices and alerts 31 can include reservation offers, notices of newly-available parking spaces, canceled reservations, revised reservations, or a change in parking regulations, as well as other type of information. The availability indicators 32 can be located on or near smart parking devices or parking services kiosks to identify a parking status of one or more parking spaces.

Figure 3:
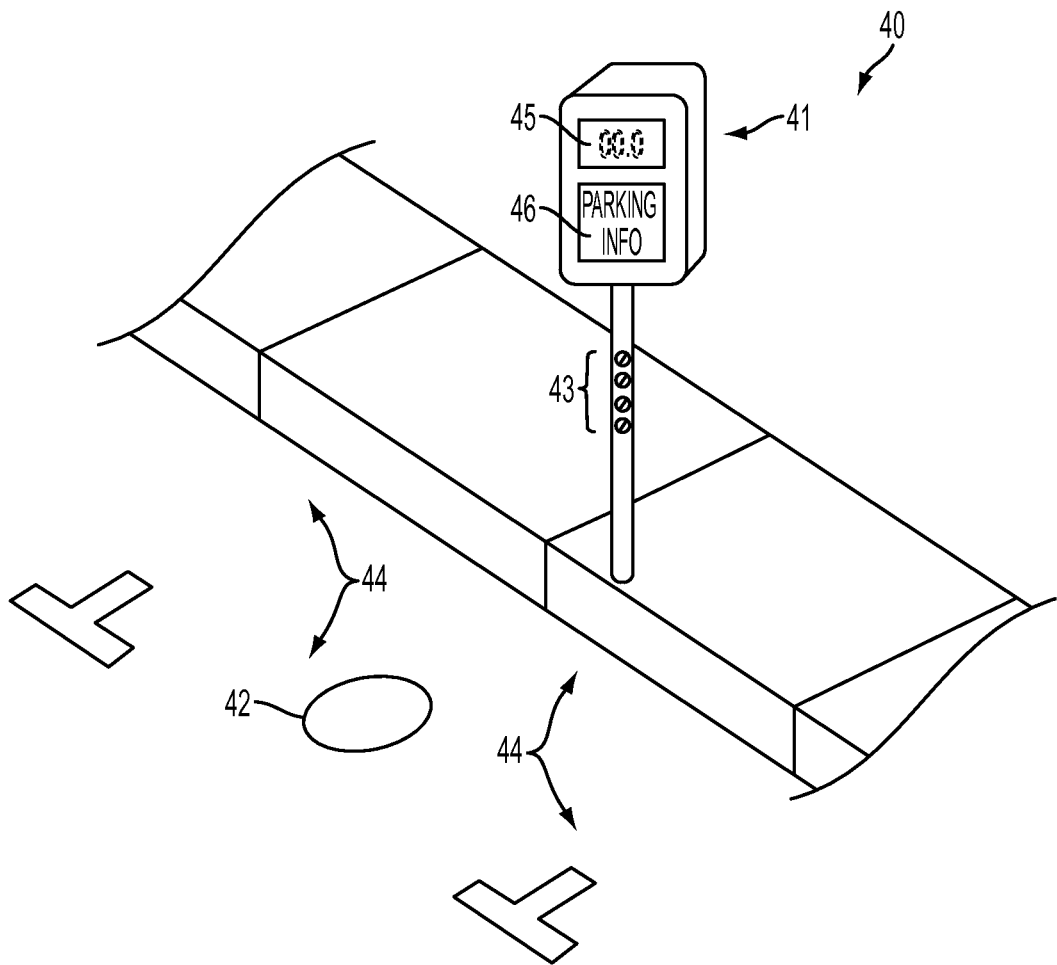
FIG. 3 is an illustration showing, by way of example, a smart parking device with a vehicle sensor and parking availability indicator for use in the system of FIG. 1.

The availability indicators 32 communicate with the parking services server 21 to display whether one or more associated parking spaces are available, reserved, or about to be reserved. FIG. 3 is an illustration 40 showing, by way of example, a smart parking device 41 with a vehicle sensor 42 and parking availability indicator 43 for use in the system 10 of FIG. 1. Each parking device 41 is interconnected over a network with the parking services server. The parking device 41 can be networked into the parking services through a wired or wireless connection. In the simplest case, each parking device 41 serves a single parking space 44 in a one-to-one relationship. Alternatively, each parking device 41 could serve a plurality of parking spaces 44 in a one-to-many relationship. For instance, at curbside, one parking device 41 could serve two adjacent parking spaces 44. In a parking lot with facing parking spaces, a parking device 41 could serve two pairs of facing parking spaces 44. Finally, several parking devices 41 could serve a multiplicity of parking spaces 44 in a many-to-many relationship; motorists would enter a number painted on the pavement or other identifier that identifies the parking space 44 that they plan to use into one of the parking devices 41.

In a further embodiment, parking services kiosks 19 (shown in FIG. 1) are located nearby to support interactive transactions for one or more parking spaces 44. The kiosks 19 need not be assigned to a specific set of parking spaces and can instead be conveniently distributed to maximize usage within a municipality. A user can simply use any available kiosk 19 to reserve parking or pay for use of a parking space, so if a line of waiting users forms at one kiosk 19, the user can move to another available kiosk 19 and avoid further delay. Acoustic and visual feedback could be provided to the user at the kiosk to interactively transact parking services. The kiosk could operate through dedicated software, or execute Web-based applications remotely served from the parking services server 11. Other forms of kiosks and kiosk-based functionality are possible.

Each parking space 44, regardless of whether the space is managed by a parking device or parking services kiosk, can be equipped with a sensor 42 for determining whether a vehicle is present in that parking space. The sensor 42 could be locally connected to a nearby parking device 41 or parking services kiosk 19, or remotely connected to the parking services server 11, which then facilitates communication between the sensor 42 and the nearby parking device 41. The sensor 42 can be networked through a wired or wireless connection. The sensor 42 can be located in a puck or similar robust enclosure fixed onto the surface of the street inside of or proximate to the parking space 44, or could be attached to the street curb. Alternatively, each sensor 42 could be incorporated into a parking device 41 using, for instance, an acoustic-, camera-, or video-based sensor. Further, like the parking devices 41, the sensors 42 can be configured in a one-to-one, one-to-many, or many-to-many relationship with a set of parking spaces 44. For instance, one video-based sensor 42 could be positioned to simultaneously monitor several parking spaces 44.

Finally, each parking space 44 can be equipped with a parking availability indicator 43. The parking indicator 43 can be locally connected to a nearby parking device 41 or remotely connected to the parking services server, which then facilitates communication between the parking indicator 43 and the nearby parking device 41. The parking indicator 43 can be networked through a wired or wireless connection. Analogous to traffic lights that indicate when vehicles may enter into intersections, parking indicators 43 indicate when vehicles may use parking spaces 44. Like the parking devices 41 and sensors 42, the parking indicators 43 can be configured in a one-to-one, one-to-many, or many-to-many relationship with a set of parking spaces 44.

Parking indicators 43 can provide physical, typically audible or visual, or digital "virtual" parking availability indications. A physical parking indicator 43 can be in a standalone enclosure or located on a parking device 41 or on a conventional parking meter. Alternatively, a parking indicator can be located in a low-profile enclosure at the curb or on the edge of the curb. A visual parking indicator can include, for instance, one or more lights or a dynamic sign, while, a digital parking indicator (not shown) can be broadcast wirelessly to nearby motor vehicles from a parking device 41 or other broadcasting source, such as a wireless transmitter locally connected to a parking device 41 or parking services kiosk 19, or remotely connected to the parking services server 11. A digital parking indicator could also be broadcast over a publically-accessible network, such as the Internet, and delivered to users electronically. For example, portable or mobile devices with global positioning system (GPS) or other location-sensing capabilities could retrieve parking status indicators concerning nearby parking spaces. Finally, in one embodiment, a parking indicator 43 is provided for each parking space 44 and is incorporated into a nearby parking device 41. Alternatively, a parking indicator 43 can be provided for a group of parking spaces 44 with indications signifying which spaces are available.

The parking indicators 43 tell motorists the status of a parking space 24. For instance, a parking space can have the status of "available," "parking," "unavailable," "no parking," "about to be reserved," or "about to be offered for reservation." Other parking statuses are possible. In a further embodiment, the status can indicate that the parking space is reserved as a loading zone, as further described in commonly-owned U.S. patent application Ser. No. 13/624,873, to Stefik, filed on Sep. 21, 2012, pending, the disclosure of which is incorporated by reference. After the delivery vehicle leaves, the service allocates a different status to the parking space, such as "available" or "unavailable."

The parking indicators 43 can provide a visual status indication, such as through color-coded indicators located on a parking device 41. The indicators can be implemented using incandescent lights, light emitting diodes, reflective surfaces, and similar materials that may only require low power, or be unpowered. Under one color coding scheme, a solid red indicator means that parking space 44 is not available at the moment due to a reservation, for example, while, a solid yellow indicator means that the parking space 44 is only available for a short time period, such as less than two hours, and a solid green indicator means that the parking space 44 is available for a long time period, such as two hours or longer. Analogous to blue markings for handicapped parking, a solid blue indicator can mean that a special permit, such as issued to handicapped motorists, is required. In a further embodiment, the color scheme can be extended beyond showing availability to indicating that the time allotted to park has expired, such as by displaying a solid red indicator to the parked motorist. Other color-coded lighted indicators are also possible.

In one embodiment, the choice of colors and their assigned meanings can be varied. For example, one variation might use blue, rather than red, to indicate that a space is reserved. Other variations might use blinking colors, such as blinking red, to indicate a parking violation, blinking yellow and blue to indicate a reserved loading zone, and red with blinking blue to indicate a parking space reserved for a guest. Still other color variations are possible.

Alternatively, visual labels or icons could be presented in lieu of static color-coded indicators. For instance, a label or icon could signal to a motorist that the time has expired or that the parking space is reserved. The amount of time available at a parking space 44 could also be shown through a label or icon. Similarly, a visual label or icon could clarify what type of permit is required to park, such as a handicapped parking permit. Other visual labels or icons are also possible.

As well, color-coded lighted indicators could be combined with flashing indicators. A red flashing indicator could be used to indicate a parking violation or expired time. A yellow and blue flashing indicator could be used to signal a reserved loading zone available for a short time period. Finally, a red and blue flashing indicator could be used to indicate a parking space reserved for a guest motorist.

Other colors, color combinations, and arrangements of solid, flashing, graduated, or adjusted lighted indicators could also be utilized as parking indicators. Similarly, indicators other than colors, such as shapes, positions, alphanumeric symbols, or icons, could be used to differentiate states of parking availability. In one embodiment, color and shape combinations similar to conventional traffic signs can be used. For example, to indicate the non-availability of a parking space 44, a plain red octagonal shape or a red octagonal shape labeled with the word "Stop" could be displayed. Alternatively, a circular shape labeled with the word "Park" could be displayed with a diagonal line crossing out the word "Park" to indicate no parking. Finally, the color green could be used with a circle, the color yellow with a triangle, and the color blue with a square, as used in some forms of traffic signage.

The parking device 41 can also display additional information to drivers. In one embodiment, each parking device 41 can have an indicator or display 45, preferably located at the top of the device 41 to enhance viewing by drivers, showing the time remaining in a parking period. In a further embodiment, each parking device 41 can also include an additional indicator or display 46 for presenting other informative data, such as public service messages or advertising. When a car is parked in the parking space 44 associated with the parking device 41, the display 45 can provide the time remaining before parking expires. When the time has expired, the display 45 can transition to a red indicator, analogous to conventional parking meters. When the parking space 44 is available, the display 45 can show how much time is left before any applicable time constraint is reached. For instance, another motorist may have separately reserved the parking space 44 through the parking services server 11, but the parking space 44 is otherwise available up until the start time of the reservation. As well, parking may become unavailable due to scheduled street cleaning or other event. A color overlay could be provided over the time indication in the display 45 to assist user understanding.

The parking devices 41, whether standalone or configured through a kiosk 19, interface motorists and other users with the parking services server 11 to locate a different parking space or to reserve a parking space, which can include the parking space associated with the parking device or a different parking space, such as described in detail with reference to commonly-owned U.S. Patent Application Publication No. 2012/0092190, filed on Jun. 15, 2011, which is hereby incorporated by reference. The motorists can directly interface with the parking devices 41 and kiosk 19 or alternatively, the parking device 41 or kiosk 19 can accept wireless transmissions, for instance, using Bluetooth, Wi-Fi, or Wi-Max protocols, or wired transmissions of the user's identification from a mobile device 15-17, such as a smart mobile telephone, notebook or tablet computer, or similar personal electronic device.

Figure 4:
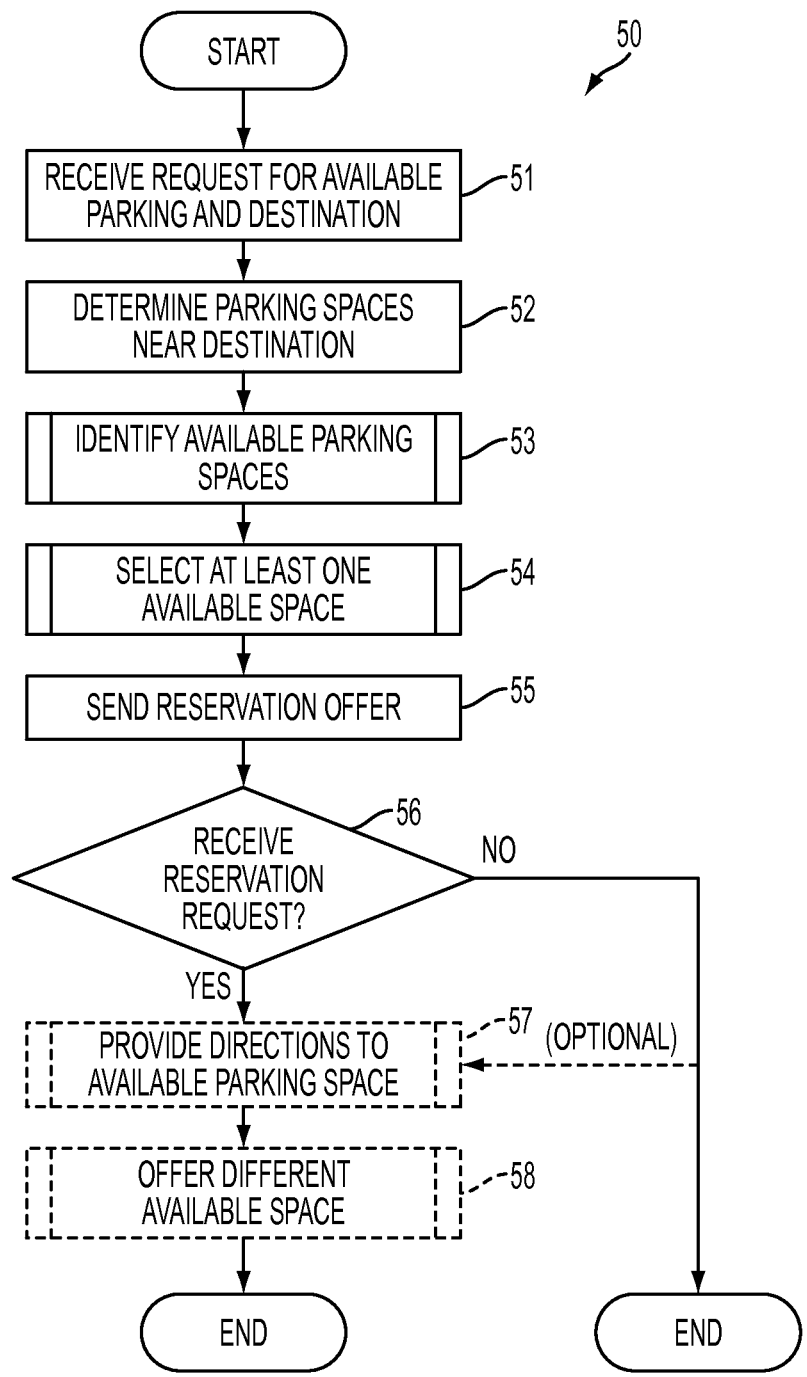
FIG. 4 is a flow diagram showing a method for spontaneously identifying and directing users to available parking spaces, in accordance with one embodiment.

Motorists and users can also communicate directly with the parking services server via a mobile device, rather than through the parking device or kiosk. FIG. 4 is a flow diagram showing a method for spontaneously identifying and directing users to available parking spaces, in accordance with one embodiment. A user who wishes to locate available parking or reserve a parking space can submit a request via a mobile computing device, such as a cell phone or tablet, prior to embarking to a destination or en route to their destination. If en route, a passenger may communicate with the parking services via a mobile computing device, the user may pull over to the side of the road to enter a request, or the request can be verbally entered while driving. Other times for submitting a request for available parking spaces are also possible.

The request can include a destination of the user, a date and arrival time, and parking preferences of the user, including closest distance, type of parking, parking site, or fee, as well as other parking characteristics. Other data for including in the request is possible. The destination can include a location of the destination, such as coordinates, or street names and numbers; or a destination name, such as Ravenna Park, Seattle Public Library or Olive and Grape restaurant. In a further embodiment, the parking characteristics are already associated with an account of the user and can be automatically retrieved for processing with the request after the user logs in to his account.

The request is transmitted from the mobile device and received (block 51) by the parking services server, which tracks one or more parking spaces. The tracking of parking spaces can be continuous to identify available spaces in real time. Specifically, the parking services first locates (block 52) parking spaces near the destination and second, determines whether any of those parking spaces are available (block 53) based on parking availability data from sensors or reservation and payment data. A distance threshold can be applied to one or more parking spaces to determine whether a space is at or near the destination. The distance threshold can be set by the user, a municipality, or as a default, as well as by others.

In one example, a user is looking for available parking near the Seattle Public Library in downtown Seattle. Twenty-three spaces are identified as being available in downtown Seattle; however, a threshold of a three-block radius of the library can be used to identify the closest available spaces. Three available parking spaces are identified to be within a three-block radius of the user's destination. A first space is located one block from the library, in a parking garage, and has a $1.50 fee. A second space is located two blocks from the library along a street, allows back in angle parking, and is free. The third space is also located two blocks from the library, but in a parking garage, and is free. One or more of the available parking spaces can be selected for providing to the user.

An available parking space is considered to be unoccupied. Occupancy, or non-occupancy, can be determined based on a presence or absence of a vehicle in a parking space, based on estimated departure times, which can be determined from pending reservation data or payment data, as further described below with reference to FIG. 5, or based on a combination of the presence or absence of a vehicle and reservation data. When occupancy is determined based on departure times of parked vehicles, all spaces with no reservations scheduled during or payment data received for the estimated arrival time of the user can be considered unoccupied and thus, available to the user. However, there is no guarantee that the space will be available since a previous user may overstay his reservation or fail to pay for the correct amount of time needed. Thus, in one embodiment, the available spaces include only those spaces that do not have a car present at the time the user request is received to ensure that the space is available when the user arrives.

One or more of the available parking spaces can be selected and provided to the user with a reservation offer. The parking spaces provided to the user can be selected (block 54) based on an estimated arrival time of the user. The arrival time can be estimated based on one or more travel characteristics, including distance of the user from the destination, speed of the user during travel, and traffic conditions during travel of the user. If the user is estimated to arrive at one of the available spaces within a particular amount of time, as defined by a threshold, that space is offered to the user, as further described below with reference to FIGS. 7 and 8.

The number of available parking spaces provided to the user can be reduced by selecting only those spaces that satisfy one or more user parking preferences, such as closest distance, type of parking, parking site, or fee, as well as other parking characteristics. Type of parking includes parallel, back-in angle, straight on, angle, or back in parking, as well as other types of parking, while parking site, including on-street, pool, lot, or garage parking. Other kinds of parking sites are possible.

The available parking spaces can be selected based on a number of characteristics satisfied or based on a ranking of the characteristics associated with the space. When ranked, the characteristics can be ordered by user preference and those parking spaces with high ranked characteristics can be selected. Returning to the example above, none of the spaces completely satisfy all of the user's preference. Thus, the second space can be selected for presenting to the user since this space is associated with characteristics that satisfy the most of the user's preferences. Alternatively, or in addition to, the user may rank distance of the space as the most important characteristic since he prefers to park in those parking spaces that are closest to his destination. In this embodiment, the first available parking space, which is one block away from the library, is selected. In a further embodiment, more than one available parking space can be selected for providing to the user. The available parking spaces can be selected as those that best satisfy the users preferences and a maximum number of parking spaces can be set by the user or as a default.

Upon selecting one or more available parking spaces, a reservation offer is generated and sent (block 55) to the user with the selected spaces. The offer can include the parking characteristics associated with each space, including distance, location, type, and fee. The reservation offer asks the user whether he would like to reserve one of the available parking spaces provided with the offer. The reservation offer can be sent via a Web page associated with the parking services, SMS text messaging, email, Instant Messaging, or via a telephone call. If the user does not want to reserve one of the available spaces (block 56), communication with the parking services ends. In a further embodiment, directions to one or more of the available spaces can optionally be provided (block 57) to prevent the user from driving around looking for an available parking space and to reduce congestion.

If the user wishes to place a reservation (block 56), the reservation can be made via a Web page associated with the parking services, SMS text messaging, email, Instant Messaging, or telephone. Additionally, payment for the reservation can be rendered concurrently with placement of the reservation via the same transmission medium or subsequent to the reservation placement via the same or different transmission medium. The reservation can be booked to begin at the estimated arrival time of the user or at a different time, such as when provided by the user. Alternatively, the reservation can start at the time of the request to ensure that another car does not park in the unoccupied space prior to the user's arrival.

After the reservation is complete, the parking services transmit confirmation of the reservation to a parking device or parking services kiosk associated with the space to indicate via a parking indicator that the space is now reserved. In one embodiment, the parking space can be reserved from the time the reservation is made, even though the user has not yet arrived at the space, to prevent others from parking before the user arrives. The parking indicator can include a visual indication, such as one or more lights or a sign with text, labels or icons. The lights can be different colors to indicate that a status of the space is reserved and unavailable to other drivers, as described above with reference to FIG. 2. In addition, the lights can blink or change colors to indicate parking status. Furthermore, a dynamic display can include a message relaying the parking space status as "reserved" or "no parking," indicating that no vehicle is to park in the space and if a vehicle does park in the space, the driver may receive a ticket or other infraction, or have his car towed to free the space for the reserving user.

In a further embodiment, the reserved parking space can remain available until the user is estimated to arrive or until just before the user's arrival, which allows another user to temporarily park in the reserved space until the scheduled user arrives. The parking indicator can display one or more different colored lights, which can be solid, blink or flash to indicate that a parking space is available for parking. Further, a dynamic sign indicator can include a message that the parking space is "available" or "has parking." Additionally, a status of "about to be reserved or offered for reservation" can be used to indicate that only a short period of time for parking remains before the space will be reserved or a previously scheduled reservation begins.

Directions to the reserved parking space can optionally be provided (block 57) via the user's mobile computing device or via a global positioning system installed in the user's vehicle. The directions can include static step-by-step directions or dynamic navigation via GPS to guide the user to the reserved space. In a further embodiment, the directions can be provided via dynamic street signs, which can be positioned at intersections, such as above the street or on a street corner, to instruct users how to reach the available parking, as further described in detail in commonly-owned U.S. patent application Ser. No. 13/725,642, to Smullin, filed on Dec. 21, 2012, pending, the disclosure of which is hereby incorporated by reference.

While en route to the reserved parking space, additional parking may be offered to the user upon a determination of availability or the user can be automatically rerouted to a different space. For instance, spaces that are located closer to the user's destination, are cheaper than, or have more preferred parking characteristics of the user than the reserved space, may be offered. If found, the newly-available parking space can be sent to the user with a reservation offer (block 58) and if reserved, directions to the newly-available space can be provided to the user. Redirecting users to different available spaces is further discussed below with reference to FIG. 9. Once the new reservation is made, the previous reservation is canceled and a status of the previously reserved parking space is changed to "available."

Once parked, the user can pay for the available space, if no payment was previously provided, via the user device, parking device, or parking kiosk. The parking space is now considered occupied and removed from the list of available parking spaces, if not previously removed upon making a reservation.

Figure 5:
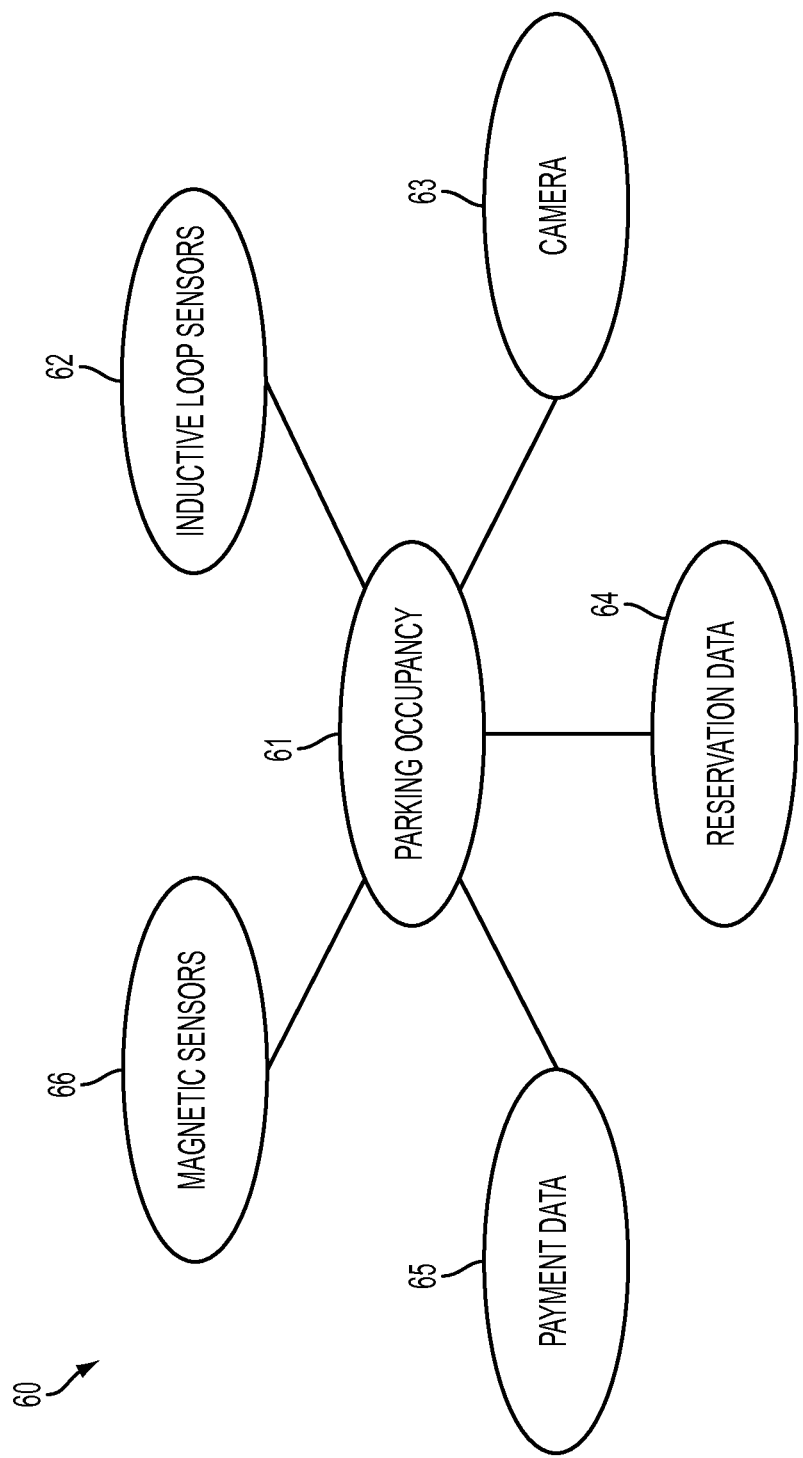
FIG. 5 is a functional block diagram showing, by way of example, tools for determining parking occupancy.

Occupancy of the parking spaces can be determined in real-time to ensure that a space is available and to prevent double booking. As described above, occupancy of a parking space can be determined based on a presence or absence of a vehicle in the space, pending parking reservations, or payment data. FIG. 5 is a functional block diagram 60 showing, by way of example, tools for determining parking occupancy 61. Occupancy of a particular parking space can be determined via one or more of inductive loop sensors 62, cameras 63, scheduled reservations 64, payment data 65, or magnetic sensors 66, as well as by other means for determining parking. A parking space is determined to be occupied, and unavailable, when a car is parked in the space, when the space has been reserved, or when the space has received payment for a particular time. In contrast, a parking space is available when unoccupied and if parking regulations allow for parking at the time in question.

To determine occupancy, each parking space can include an inductive loop sensor 62 with wire coils that can be embedded into the street of the parking space. Each inductive loop sensor 62 determines occupancy, such as by detecting whether a car is parked in the corresponding parking space via inductance. Alternatively, cameras 63 and magnetic 66 sensors can each be used to watch one or more parking spaces and detect when each of the watched spaces is occupied by a vehicle. The cameras 63 and magnetic 66 sensors can be positioned on a lamp post, on individual parking meters, or by multi-space parking meters to monitor one or more parking spaces. A sensor 62, 66 or camera 63 can be installed in each parking space in a one-to-one fashion. Alternatively, each sensor 62, 66 or camera 63 can be configured in a one-tomany or many-to-many relationship with a set of parking spaces. For instance, one camera-based sensor could be positioned to simultaneously monitor several parking spaces.

Combined use of the parking devices and parking services kiosks can also be used to monitor the parking spaces and determine occupancy. For example, the parking services kiosks can be used to manage a parking pool, which includes a plurality of parking spaces that can be physically adjacent to each other or disbursed and can be managed as a group, rather than individually for each space, while a parking device is used to manage one of the parking spaces in the pool during set days and times during which that parking space does not participate as part of the parking pool and is instead used as an individually reservable or managed parking space. Outside of the set days and times, the parking device either mirrors the group parking operations and parking indicators of the parking services kiosks, or is inactive.

Payment data 65 for the parking spaces can also be used to determine occupancy. The payment data 65 can be obtained from the user devices, parking devices, or parking services kiosks to identify which or how many parking spaces have been paid for in advance and in some cases, for how long the parking spaces will be occupied. For instance, a first parking device has received payment for two hours of parking, while a second parking device has received no payment. Thus, the parking space associated with the second parking meter is determined to be available and can be offered to the user, while the first space is considered to be occupied and unavailable to other users.

In a further embodiment, occupancy factors can be applied to account for uncertainties, such as handicapped placards that allow for parking without payment, broken payment sensors, noisy or malfunctioning or vandalized occupancy sensors, or metered spaces that are illegally or otherwise occupied without payment, such as by delivery vehicles, which can be managed via just-in-time loading zone parking, as described in U.S. patent application Ser. No. 13/624,873, filed on Sep. 21, 2012. The factors can be used to adjust the number of available parking spaces determined via the parking data by, for example, an average ratio of unpaid occupied spaces to paid occupied spaces to provide a best estimate of available parking spaces. Other examples for considering the occupancy factors and uncertainties are possible. Logs of the parking spaces and corresponding payment data can be maintained in real-time or predetermined times, and stored. The payment data can be maintained individually by each parking device or centrally, such as by the parking kiosk. Additionally, occupancy of a parking space can be determined using reservation data 64, such as when a parking space is reserved, but payment is not made in advance. The reservation data indicates a start time at which a parking space is to be held for a user and thus, can be considered unavailable.

Figure 6:
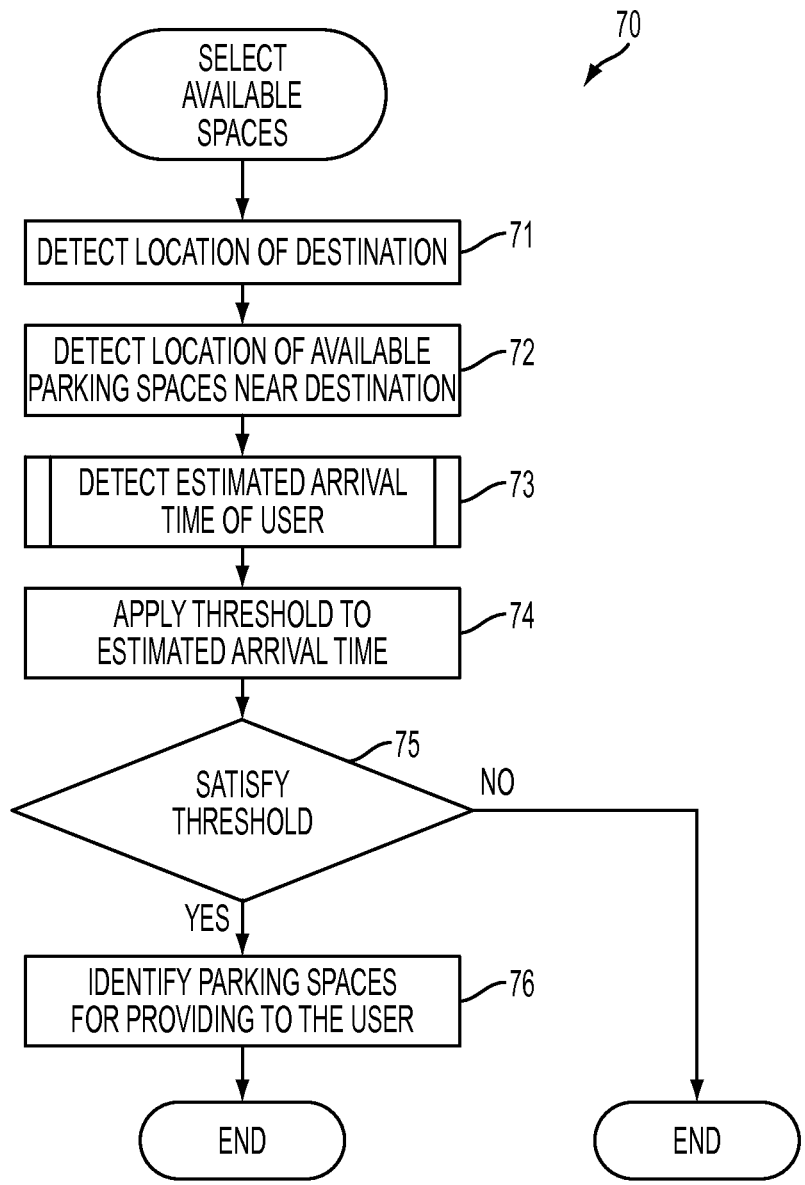
FIG. 6 is a flow diagram showing, by way of example, a process for selecting one or more available parking spaces for providing to a user.

The occupancy data is used to determine available parking spaces from which one or more spaces can be selected for providing to a user. FIG. 6 is a flow diagram showing, by way of example, a process 70 for selecting one or more available parking spaces. A location associated with the destination of the user is determined (block 71), if not already provided. For instance, in the above example, the user identifies his destination only as the Seattle Public Library with out providing further information, such as an address, street name, zip code, or location coordinates, which can be determined by GPS. Meanwhile, an address or street name can be determined via a database of places and addresses.

A location of each available parking space is also identified (block 72), such as by looking up the desired information in a database of parking spaces, each associated with parking characteristics, including location, type, site, or fee. The locations of the user and each available parking space are used to determine (block 73) an estimated arrival time of the user at each space. The estimated arrival time can be determined for one or more routes from the user's destination to an available parking space based on travel characteristics, such as route, traffic, distance, and speed, as further discussed below with reference to FIGS. 7 and 8. For instance, an available parking space is located near the Seattle Public Library and can be reached via Interstate 5 or Eastlake Avenue. I-5 is a major highway that runs through Seattle and is usually congested during rush hour; however, Eastlake Avenue is an arterial on which less vehicles pass through. The estimated arrival time can be determined for the I-5 route and the Eastlake Avenue route to determine which will allow the user to arrive at the available parking space the fastest. Subsequently, the fastest route can be recommended to the user.

An arrival time threshold is applied to one or more of the estimated arrival times determined for the user (block 74). Each parking space can be associated with an arrival time threshold or alternatively, a single threshold may be used for two or more spaces. The threshold can indicate the amount of time that a space will be held for the user while en route to that space. For instance, an available space in which no vehicle is parked may be associated with a 10 minute arrival threshold, such that if the user is estimated to arrive within 10 minutes from the time of the request, the space will be selected and provided to the user. However, if the user is estimated to arrive later than 10 minutes, the space will not be offered to the user for reservation. The arrival threshold works to ensure that reserved parking spaces remain empty while the users are en route, while considering that other users are prevented from using the space during the hold and should not be unnecessarily held for long periods of time.

If the estimated arrival time of the user does not satisfy (block 75) the threshold, no reservation offer is sent to the user for the available parking space. Meanwhile, if the estimated arrival time satisfies (block 75) the threshold, the corresponding available parking space can be provided to the user with a reservation offer (block 76).

Figure 7:
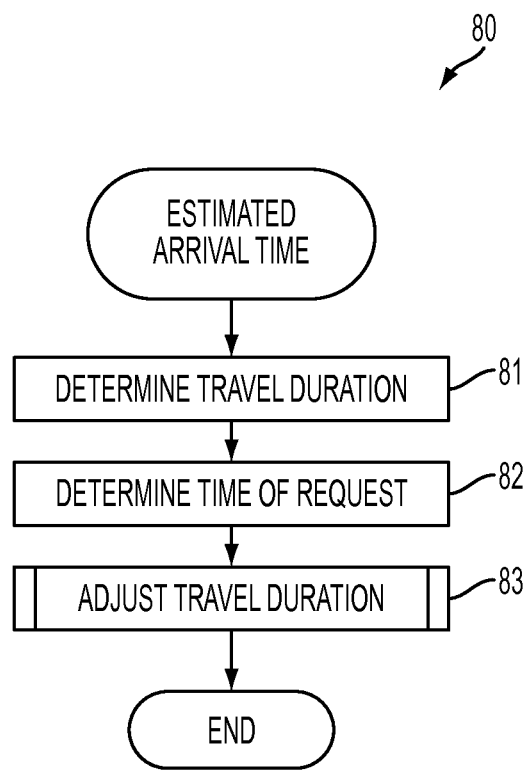
FIG. 7 is a flow diagram showing, by way of example, a process for determining an estimated arrival time of a user.

The estimated arrival time of a user can be based on, for example, travel characteristics, which cover travel conditions of a route along which the user may travel. FIG. 7 is a flow diagram 80 showing, by way of example, a process for determining an estimated arrival time. A travel duration of a trip from a location of the user to the destination is determined (block 81). The travel duration can be measured in time increments, such as minutes, hours, days, or a combination of minutes, hours, and days. The duration can be determined using predetermined times that are associated with a particular route from a user location to a user destination. For example, a database can be interconnected to the parking services server for storing travel routes, which are each associated with predetermined times for travel along the route. Additionally, the predetermined times for a route can be determined via a third party, such as Mapquest or Google Maps. Next, a departure time of the user is determined (block 82), such as by requesting the user to provide the departure time. In a further embodiment, the user may have already begun his trip to the destination and the time at which the user's location is determined can be designated as the departure time.

Figure 8:
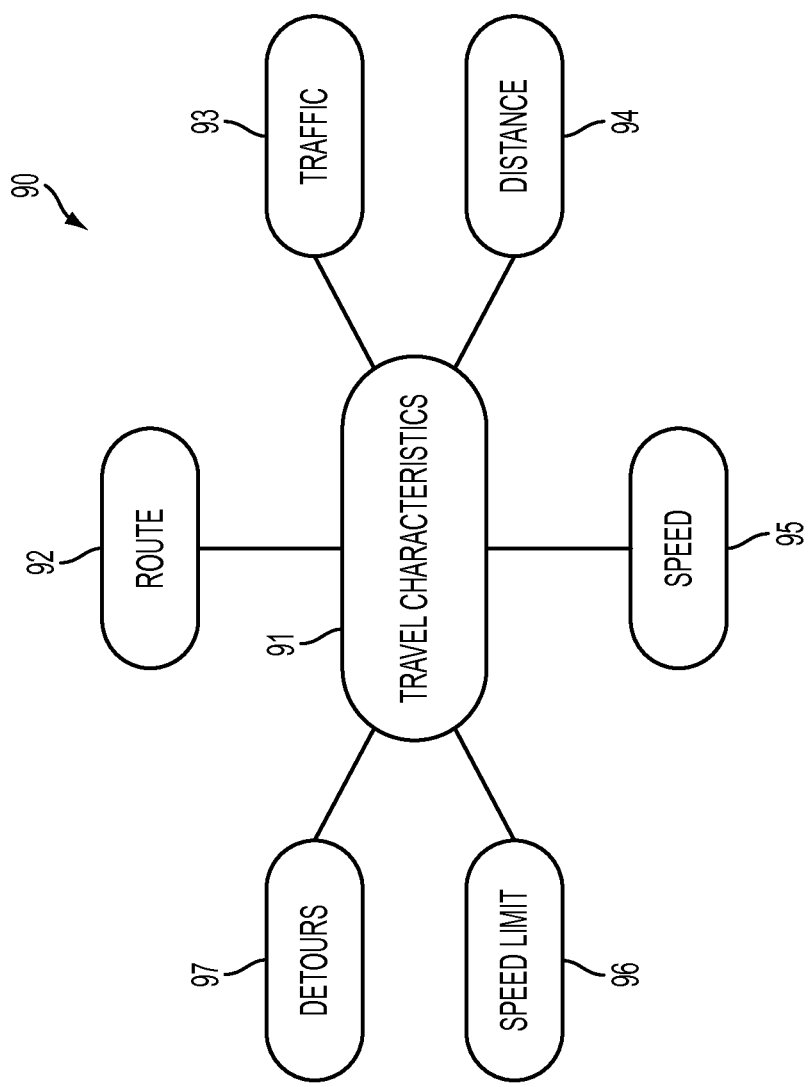
FIG. 8 is a functional block diagram showing, by way of example, travel characteristics for use in determining an estimated arrival time of a user.

Subsequently, the predetermined destination time can be optionally adjusted (block 83) by one or more travel characteristics as described above to increase or decrease the estimated arrival time of the user to more accurately reflect the actual arrival time. FIG. 8 is a functional block diagram 90 showing, by way of example, travel characteristics 91 for use in determining an estimated arrival time of a user. The travel characteristics can include route 92, traffic 93, distance 94, speed 95, speed limit 96, and detours 97. Route covers, for instance, the best route to the parking space. Other travel characteristics are possible.

The traffic travel characteristic 93 considers traffic conditions during the time of the user's travels to his destination. For instance, in rush hour traffic, the estimated arrival time may be later than when the user travels during non-rush hour times. The distance characteristic 94 considers the distance between the user's current location when the request is made and the available parking space. Longer distances can require more travel time and usually, a later estimated arrival time, whereas shorter distances are associated with earlier estimated arrival times. The speed characteristic 95 identifies how fast traffic is moving and specifically, the user. A faster speed is associated with an earlier estimated arrival time, while a slower speed can increase the estimated arrival time. In a further embodiment, the speed limit 96 can be used to determine the estimated arrival time, such as when the current speed of traffic is unavailable. Detour characteristics 97 can be used to determine whether a user may be delayed in arriving to the available parking space due to any detours in a selected route to the space. Detours can increase the estimated arrival time. The travel characteristics can be selected by a city, state, or other municipality in which the system is used or can be set as a default.

Application of the estimated arrival time threshold assists in managing the available parking spaces and dispersing the spaces for use. Specifically, the threshold allows a user to reserve those available parking spaces with no vehicle present to ensure the space remains available, while preventing unnecessary holding of the space for a user who will not arrive for a long period of time. Returning to the above library example, Braylon and Kiyomi are on their way to the Seattle Public Library (SPL) in downtown Seattle to do some research for a group presentation. Braylon is driving and Kiyomi is sitting in the passenger side. They leave the University of Washington (UW) at 4:20 p.m., which is during rush hour in Seattle and as they leave, Kiyomi sends a request with to the parking services server for available parking near the library. As described above, three spaces are identified as available: the first space is located one block from the library, in a parking garage, and has a $1.50 fee; the second space is located two blocks from the library along a street, allows back in angle parking, and is free; and the third space is also located two blocks from the library, but in a parking garage, and is free. In this example, all the available parking spaces are unoccupied, such that no vehicle is present and no reservations are pending.

The location of Braylon and Kiyomi is determined and used to calculate an estimated arrival time to each of the available parking spaces identified. An initial arrival time for each of the available spaces is determined based on the distance of a route along which Braylon and Kiyomi can travel to arrive at the available space and speed limits along the route. There are two possible routes for traveling from the UW to the SPL, the first along Eastlake and the second, on the highway. Estimated arrival times for both routes can be determined, but in this example, only the route along Eastlake will be considered. Further, since each of the three available parking spaces are within two blocks of each other, a single estimated arrival time is appropriate as the spaces are very close. However, if the parking spaces were further apart such that arrival at one space would take significantly longer, an estimated arrival time should be determined for each space. The initial arrival time can be obtained from a database interconnected to the parking services server in which routes are stored with estimated travel time or from third party databases.

Without traffic and by complying with all speed limits, the time to travel, or the travel duration, from the UW to the SPL is 15 minutes. However, Braylon and Kiyomi are traveling during rush hour, during which the traffic is more congested and the speed is slower than the posted speed limit due to the congestion. Accordingly, the initial travel duration of 15 minutes is adjusted to account for the rush hour traffic, which is determined to increase the travel time by three minutes for a total time of 18 minutes. The estimated arrival time is then determined by adding the adjusted travel duration of 18 minutes to the time of the request at 4:20 p.m. Thus, Braylon and Kiyomi are estimated to arrive at the available parking spaces at 4:38 p.m.

A first arrival time threshold of 17 minutes is applied to the first and second available spaces and a second arrival threshold of 20 minutes is applied to the third available space to select those spaces for providing to the user, Kiyomi. The threshold arrival times can differ for one or more spaces based on a popularity, cost, or location of the space, as well as other variables associated with the space. Other threshold factors are possible. For example, since the first space is closer to the library and more desirable, the threshold is shorter to avoid preventing other users, such as those physically near the space, from parking while reserving the space for Braylon and Kiyomi. Since Braylon and Kiyomi are estimated to arrive in 18 minutes, only the third space is offered for reservation since this space satisfies the 20 minute arrival threshold.

In a further embodiment, the request can be made while in transit. For example, as Braylon is driving, Kiyomi sends the request five minutes into the trip to the SPL. Thus, the estimated arrival time is dependent on their location at the time the request is made. Since they are five minutes into an initial arrival time of 15 minutes, the new initial arrival time is 10 minutes. Subsequently, the initial arrival time is adjusted to reflect travel through rush hour traffic. Braylon and Kiyomi have not yet hit the traffic so the three additional minutes as determined above for traffic is added to the initial arrival time to calculate the estimated arrival time of 13 minutes. The adjusted arrival time satisfies the threshold for all three parking spaces, which are provided with a reservation offer.

To ensure the user easily locates the available space, directions to selected or reserved available space can be provided. The directions can follow the route identified and selected for determining the estimated arrival time, as described above with reference to FIG. 7 or a different route. In one example, the user can select a particular route of preference. Alternatively, a route can be automatically selected based on route characteristics, including distance, busyness, traffic, speed, and detours of the route. Other route characteristics are possible. In one embodiment, directions can be provided to each user that has indicated interest in receiving directions to a selected available space, regardless of whether the user has placed a reservation. However, in a further embodiment, the directions may only be provided to those users who have placed a reservation.

Figure 9:
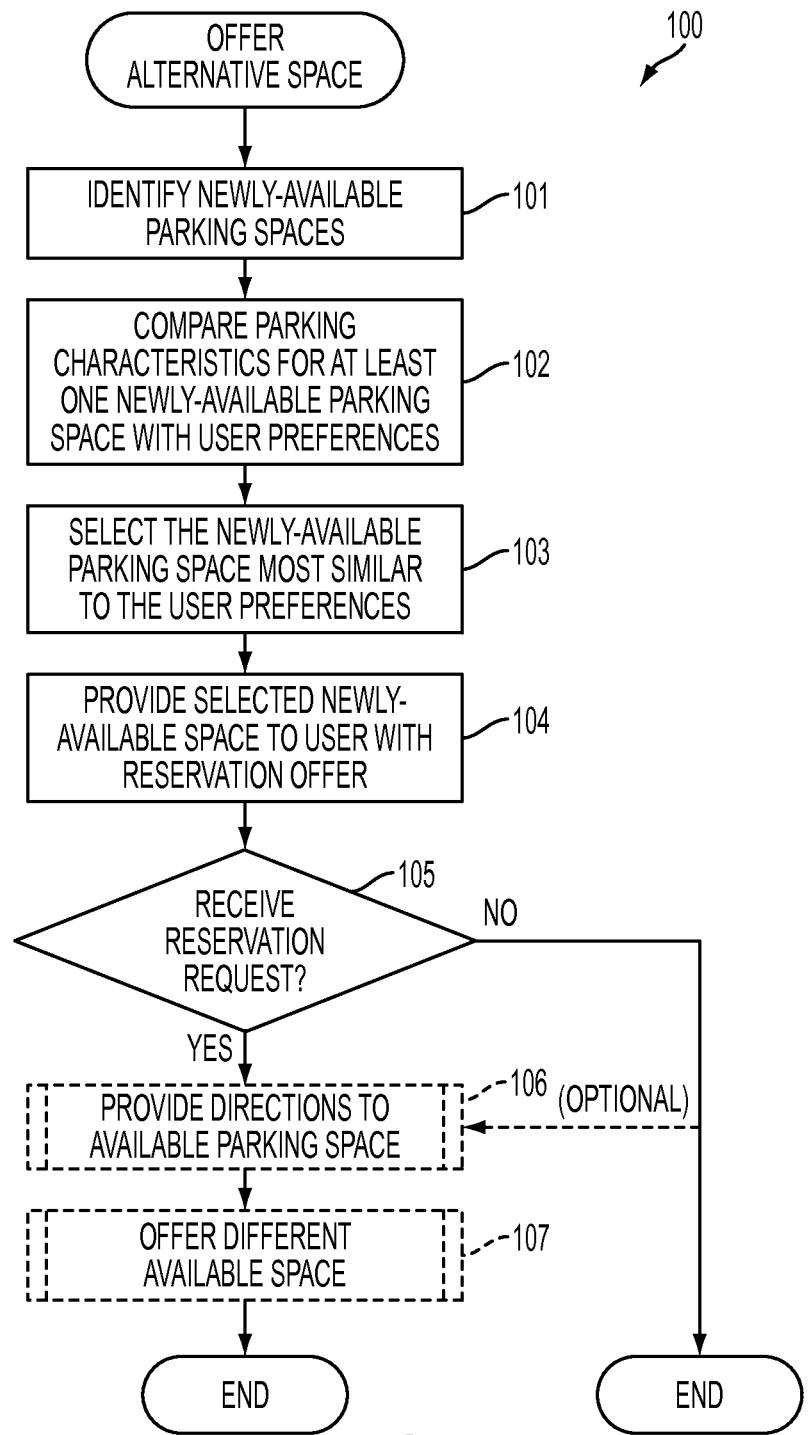
FIG. 9 is a flow diagram showing, by way of example, a process for identifying and offering alternative available parking spaces.

As the user is en route to the parking space, additional parking spaces near the user's destination may become available. One or more of the newly-available parking spaces can be offered to the user, such as when a newly-available parking is closer to the user's destination than the reserved space. FIG. 9 is a flow diagram showing, by way of example, a process for identifying and offering alternative available parking spaces. One or more newly-available parking spaces can be identified (block 101) while the user in en route to his destination. Parking characteristics associated with the newly-available spaces can be compared (block 102) with at least one set of parking preferences for a user who has sent a request for available parking, and selected or reserved a parking space. The parking characteristics, can include a duration of parking needed, desired price or price range of the parking, parking site, such as on-street or in a garage, and type of the parking, such as back in angle parking or parallel parking, as described above in detail with reference to FIG. 8.

One or more of the newly-available parking spaces that satisfies more of the user's parking preferences than the previously selected available space or reserved space is selected (block 103). In one embodiment, the parking preferences can be ranked, such that a first ranked parking characteristic is most important to the user, while the lower ranked characteristics are less important. A parking space that is most similar to the user's preferences can include one with characteristics that are highest ranked or that share the highest number of characteristics in common with the user's preferences.

Once selected, the newly-available space can be provided to the user with a reservation offer (block 104). The user can determine whether he would rather park in the newly-available space, rather than the previously reserved space, and if so, the user sends a request for reservation (block 105). When the newly-available space is reserved, the previously reserved space can be automatically released for providing to another user. Once the reservation is processed, directions to the newly-available space from the current location of the user can be optionally provided (block 106). Subsequently, further parking spaces can optionally be offered (block 107) to the user as they become available before the user reaches his destination. Alternatively, the user may not reserve (block 105) the newly-available space because he is happy with the previously-identified space that may or may not be reserved, or the user wishes to park in the newly-identified space without first reserving the spot. In a further embodiment, the user can be automatically rerouted to the newly-available space, without sending a reservation offer and receiving a reservation request. In either case, directions can be optionally provided (block 106) to the user to direct him to the newly-available space and different available spaces may optionally be offered (block 107).

Upon arrival at the available space, the user can park and pay for the space, if not previously paid. When user is ready to leave the space, conflict can occur between an inbound vehicle that is physically waiting for the space to become vacant and a remote user, possibly en route, that wishes to reserve the space. To avoid these types of conflicts, a time delay can be introduced before the parking space is determined to be available for providing to a remote user who sends a request for available parking. For instance, returning to the above-identified example, Braylon and Kiyomi have completed their research and are ready to leave. Once their car has left the space, a sensor determines that the parking space is available. Instead of immediately offering the available space to a remote user who is looking for an available parking space while en route to a destination, a predetermined time delay, such as a five minutes or any other time, can be implemented to allow other drivers that physically approach the space to park. If the space is not filled within the predetermined time delay, the space can be offered to a remote user for reservation. In one embodiment, a status of the space can enter an "about to be offered for reservation" period, which indicates to a driver that is physically near the space to park, otherwise, the space will be reserved.

A parking indicator can be used to display the status of one or more parking spaces as described above with reference to FIG. 3. For instance, returning to the scenario above, a predetermined time delay of five minutes is implemented during which other drivers or users that physically approach the space can park. The other drivers and users know that the space is available for parking because a parking indicator associated with the space displays an indication of available parking, such as by a display of one or more lights that can be the same or different colors, which are solid, flash, or blink. Alternatively, a dynamic sign can display a text message to indicate that the parking is available.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for identifying available parking spaces, comprising:
    a tracking module to track a status of parking spaces;
    a destination receipt module to receive a destination of a user;
    a parking identification module to determine one or more available parking spaces for the user, comprising:
    a location module to locate parking spaces near the destination based on a distance threshold; and
    a destination selection module to identify those parking spaces near the destination that are available;
    a parking selection module to identify at least a portion of the available parking spaces for providing to the user, comprising:
    a storage module to store a predetermined arrival threshold for each of the tracked parking spaces, wherein each arrival threshold comprises an amount of time that the associated parking space will be held for the user based on one or more of a popularity and cost of that parking space;
    an arrival determination module to determine an estimated arrival time of the user to each of the available parking spaces;
    a threshold application module to apply the arrival threshold associated with each of the available parking spaces to the estimated arrival time of the user to that available parking space;
    a space selection module to select from all the available parking spaces, only those available parking spaces with arrival thresholds that are satisfied by the user's estimated arrival time;
    an offer module to send to the user, a reservation offer for each of the available parking spaces selected from all of the available parking spaces;
    and a processor to execute the modules.

2. A system according to claim 1, wherein the arrival determination module determines the estimated arrival time, comprising:
    a route identification module to identify a route from a location of the user to the destination and to obtain an initial: estimated arrival time based on the identified route; and
    an arrival adjustment module to adjust the initial estimated arrival time based on travel characteristics to determine the estimated arrival time.

3. A system according to claim 2, wherein the travel characteristics comprise at least one of travel route, traffic, distance, speed, speed limit, and detours.

4. A system according to claim 1, further comprising:
a reservation module to book a reservation for the available space when the user affirmatively replies to the reservation offer.

5. A system according to claim 1, further comprising:
associating one or more parking preferences with the user, wherein the parking preferences include at least one of parking distance, type of parking, parking site, and fee.

6. A system according to claim 5, further comprising:
the parking identification module to identify a newly-available parking space;
a comparison module to compare characteristics of the newly-available parking space with the user preferences; and
the offer module to offer the newly-available parking space to the user when the newly-available parking space is more similar to the user preferences than the available parking space.

7. A system according to claim 6, further comprising:
a reservation module to receive a further reservation request from the user for the newly-available parking space; and
a reservation cancellation module to cancel the reservation of the available parking space.

8. A system according to claim 1, further comprising:
an availability module to determine an availability of at least one of the parking spaces based on at least one of a sensor, camera, payment data, and reservation data.

9. A system according to claim 1, further comprising:
a display to display a status of the parking spaces via parking indicators comprising one or more of a digital notification via a user device and located on at least one of a parking device and parking kiosk.

10. A system according to claim 1, further comprising:
a direction module to provide directions to the available parking space.

11. A method for identifying available parking spaces, comprising the steps of:
tracking a status of parking spaces;
receiving a destination of the user;
determining one or more available parking spaces for the user, comprising:
locating parking spaces near the destination based on a distance threshold; and
identifying those parking spaces near the destination that are available;
identifying at least a portion of the available parking spaces for providing to the user, comprising:
storing a predetermined arrival threshold for each of the tracked parking spaces, wherein each arrival threshold comprises an amount of time that the associated parking space will be held for the user based on one or more of a popularity and cost of that parking space;
determining an estimated arrival time of the user to each of the available parking spaces;
applying the arrival threshold associated with each of the available parking spaces to the estimated arrival time of the user to that available parking space; and
selecting from all the available parking spaces, only those available parking spaces with arrival thresholds that are satisfied by the user's estimated arrival time; and
sending to the user, a reservation offer for each of the available parking spaces selected from all of the available parking spaces,
wherein the steps are performed by a suitably-programmed computer.

12. A method according to claim 11, further comprising:
determining the estimated arrival time, comprising:
identifying a route from a location of the user to the destination;
obtaining an initial estimated arrival time based on the identified route; and
adjusting the initial estimated arrival time based on travel characteristics to determine the estimated arrival time.

13. A method according to claim 12, wherein the travel characteristics comprise at least one of travel route, traffic, distance, speed, speed limit, and detours.

14. A method according to claim 11, further comprising:
booking a reservation for the available space when the user affirmatively replies to the reservation offer.

15. A method according to claim 11, further comprising:
associating one or more parking preferences with the user, wherein the parking preferences include at least one of parking distance, type of parking, parking site, and fee.

16. A method according to claim 15, further comprising:
identifying a newly-available parking space;
comparing characteristics of the newly-available parking space with the user preferences; and
offering the newly-available parking space to the user when the newly-available parking space is more similar to the user preferences than the available parking space.

17. A method according to claim 16, further comprising:
receiving a further reservation request from the user for the newly-available parking space; and
canceling the reservation of the available parking space.

18. A method according to claim 11, further comprising:
determining an availability of at least one of the parking spaces based on at least one of a sensor, camera, payment data, and reservation data.

19. A method according to claim 11, further comprising:
displaying a status of the parking spaces via parking indicators comprising one or more of a digital notification via a user device and located on at least one of a parking device and parking kiosk.

20. A method according to claim 11, further comprising:
providing directions to the available parking space.

* * * * *